(12) United States Patent
Taguchi et al.

(10) Patent No.: US 8,896,321 B2
(45) Date of Patent: Nov. 25, 2014

(54) ABNORMALITY DETECTION SYSTEM

(75) Inventors: Yuichi Taguchi, Kariya (JP); Tsuyoshi Koike, Kariya (JP); Atsushi Yamaguchi, Kariya (JP)

(73) Assignee: Kabushiki Kaisha Toyota Jidoshokki (JP)

( * ) Notice: Subject to any disclaimer, the term of this patent is extended or adjusted under 35 U.S.C. 154(b) by 343 days.

(21) Appl. No.: 13/189,960

(22) Filed: Jul. 25, 2011

(65) Prior Publication Data

US 2011/0316553 A1 Dec. 29, 2011

(30) Foreign Application Priority Data

Jun. 27, 2010 (JP) .................................. 2010-168295

(51) Int. Cl.
- *G01R 31/00* (2006.01)
- *B60L 11/18* (2006.01)
- *B60L 3/00* (2006.01)

(52) U.S. Cl.
CPC ............ *B60L 11/182* (2013.01); *Y02T 10/7088* (2013.01); *Y02T 90/14* (2013.01); *B60L 2270/36* (2013.01); *Y02T 10/7005* (2013.01); *B60L 3/00* (2013.01); *Y02T 90/122* (2013.01)
USPC ............................. 324/546; 324/654; 324/503

(58) Field of Classification Search
USPC .............. 324/500, 537, 76.11, 503, 546, 547, 324/654; 307/104
See application file for complete search history.

(56) References Cited

U.S. PATENT DOCUMENTS

| | | | | |
|---|---|---|---|---|
| 4,224,652 A | * | 9/1980 | Fiorentzis | ........................ 361/42 |
| 4,612,498 A | * | 9/1986 | Smalley | ........................ 324/503 |
| 2010/0188199 A1 | | 7/2010 | Tanaka et al. | |
| 2010/0244579 A1 | * | 9/2010 | Sogabe et al. | ................ 307/104 |
| 2011/0241440 A1 | * | 10/2011 | Sakoda et al. | ................ 307/104 |
| 2011/0270462 A1 | | 11/2011 | Amano et al. | |

FOREIGN PATENT DOCUMENTS

| | | |
|---|---|---|
| CN | 101483357 | 7/2009 |
| JP | 2006-345588 | 12/2006 |
| JP | 2009-023448 | 2/2009 |
| JP | 2009/029177 | 2/2009 |
| JP | 2010-119246 | 5/2010 |
| JP | 2012-005320 | 1/2012 |
| WO | WO 2009/054221 | 4/2009 |
| WO | WO 2010/032309 | 3/2010 |

OTHER PUBLICATIONS

Chinese Patent Application No. 2011102125898.8: First Office Action dated Jul. 4, 2013, 15 pages.

* cited by examiner

*Primary Examiner* — Vincent Q Nguyen
(74) *Attorney, Agent, or Firm* — Baker & Hostetler LLP (57) ABSTRACT

The abnormality detection system is provided for detecting an abnormality of an object. The abnormality detection system includes a high-frequency power source, a primary coil, a secondary coil and a controller. The high-frequency power source supplies power. The primary coil receives the power supplied from the high-frequency power source. The secondary coil is mounted to the object in noncontact with the primary coil for receiving power supplied from the primary coil. The controller is operable to detect the power received by the secondary coil and also to determine whether or not an abnormality is present in the object based on the detected power.

4 Claims, 7 Drawing Sheets

ABNORMALITY DETECTION SYSTEM

CROSS REFERENCE TO RELATED APPLICATIONS

This application claims priority to Japanese Patent Application No. 2010-168295 filed Jul. 27, 2010.

BACKGROUND

The present invention relates to an abnormality detection system.

There has been known various abnormality detection systems. Japanese Unexamined Patent Application Publication No. 2009-23448 discloses an abnormality detection system having an intrusion detector using radio waves, sound waves, supersonic waves and so forth for detecting illegal activities to automobile.

The present invention is directed to an abnormality detection system by a new structure.

SUMMARY

In accordance with an aspect of the present invention, there is provided an abnormality detection system for detecting an abnormality of an object. The abnormality detection system includes a high-frequency power source, a primary coil, a secondary coil and a controller. The high-frequency power source supplies power. The primary coil receives the power supplied from the high-frequency power source. The secondary coil is mounted to the object in noncontact with the primary coil for receiving power supplied from the primary coil. The controller is operable to detect the power received by the secondary coil and also to determine whether or not an abnormality is present in the object based on the detected power.

Other aspects and advantages of the invention will become apparent from the following description, taken in conjunction with the accompanying drawings, illustrating by way of example the principles of the invention.

BRIEF DESCRIPTION OF THE DRAWINGS

The invention together with objects and advantages thereof, may best be understood by reference to the following description of the presently preferred embodiments together with the accompanying drawings in which.

DETAILED DESCRIPTION OF ILLUSTRATIVE EMBODIMENTS

The following will describe the abnormality detection system according to the embodiment of the present invention with reference to the accompanying drawings. In the present embodiment, the abnormality detection system detects an abnormality and gives an alarm in response to the detection. More specifically, the abnormality detection system of the present embodiment is applied to a resonance type noncontact charging system for charging a battery installed in a vehicle such as a hybrid vehicle, a fuel cell powered vehicle or an electric automobile.

Figure 1A:
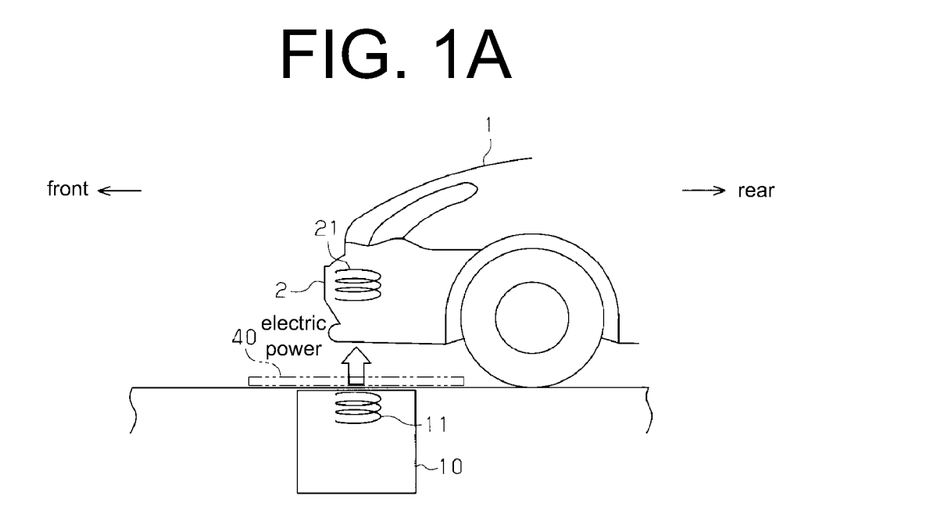
FIGS. 1A and 1B are schematic views showing an automobile and a part of an abnormality detection system according to an embodiment of the present invention.

As shown in FIG. 1A, the automobile 1 has in the front bumper thereof a power receiving coil 21 which is formed by winding, for example, a copper wire in a spiral manner. The power receiving coil 21 is disposed so that its axis (or the central axis of the spiral wire) extends in vertical direction of the automobile 1.

A ground installation 10 having therein a power transmission coil 11 is embedded in the ground. The power transmission coil 11 is formed by winding, for example, a copper wire in a spiral manner. The power transmission coil 11 is disposed so that its axis (or the central axis of the spiral wire) extends in perpendicular relation to the ground. In charging the battery of the automobile 1, the power receiving coil 21 is set relative to the power transmission coil 11 so that the axis of the power receiving coil 21 is substantially aligned with the axis of the power transmission coil 11.

Figure 2:
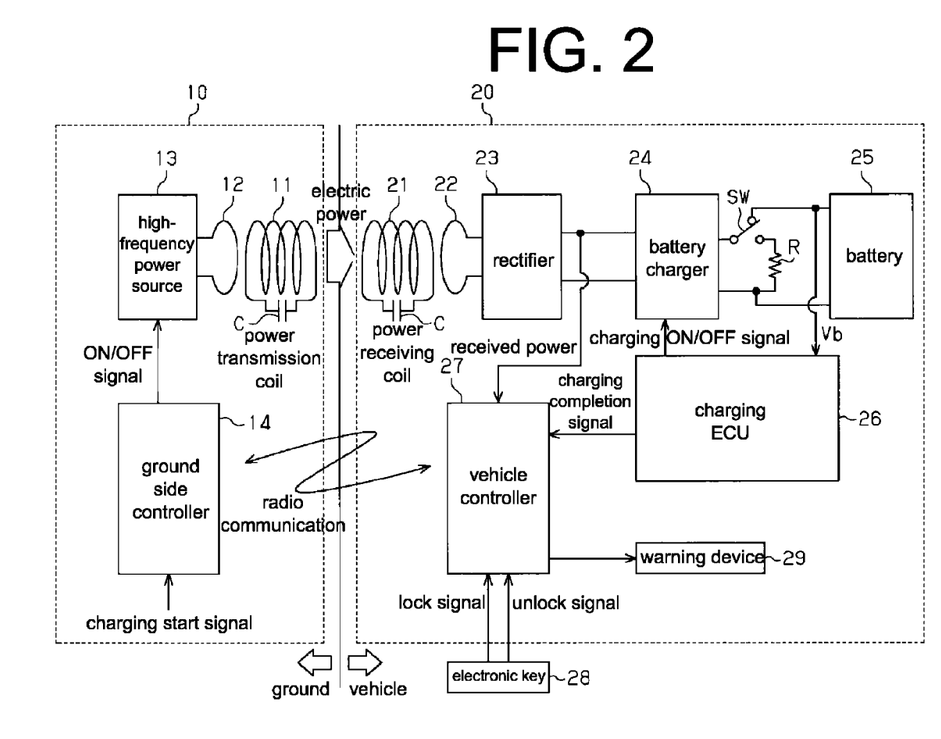
FIG. 2 is a circuit diagram showing an electrical configuration of the abnormality detection system (or a resonance type noncontact charging system) according to the embodiment of the present invention.

Referring to FIG. 2 showing the configuration of the abnormality detection system (or the resonance type noncontact charging system), the ground installation 10 includes the aforementioned power transmission coil 11, a coil 12, a high-frequency power source (alternating-current power source) 13 and a ground side controller 14. Vehicle equipment 20 installed in the automobile 1 includes the aforementioned power receiving coil 21, a coil 22, a rectifier 23, a battery charger 24, a battery 25 that is a secondary battery, a charging ECU 26, a vehicle controller 27 and a warning device 29.

The ground side controller 14 of the ground installation 10 and the vehicle controller 27 of the vehicle equipment 20 are communicable to each other via radio waves. The high-frequency power source 13 outputs a high-frequency power, for example, in the order of a few megahertz.

The coil 12 is connected to the high-frequency power source 13. The power transmission coil 11 is arranged in such a position that the power transmission coil 11 can be magnetically coupled to the coil 12 and receives power from the coil 12 by electromagnetic induction. Thus, the power transmission coil 11 that serves as a primary coil receives a high-frequency power from the high-frequency power source 13 via the coil 12. A capacitor C is connected to the power transmission coil 11.

The ground side controller 14 controls the operation of the high-frequency power source 13. In the present embodiment, the ground side controller 14 transmits ON/OFF signals to the high-frequency power source 13 based on a charging start signal and controls the output power of the high-frequency power source 13.

The power receiving coil 21 that serves as a secondary coil is provided in the automobile 1 that serves as an object of abnormality detection, and arranged in noncontact with the power transmission coil 11. The power receiving coil 21 receives power from the power transmission coil 11 by magnetic field resonance.

The coil 22 is arranged in such a position that the coil 22 can be magnetically coupled to the power receiving coil 21 and receives power from the power receiving coil 21 by electromagnetic induction. The rectifier 23 is connected to the coil 22 for rectifying the power from the coil 22. A capacitor C is connected to the power receiving coil 21.

The battery charger 24 is connected to the rectifier 23 for stepping up the power rectified by the rectifier 23. The battery charger 24 has a switching element and adjusts the output voltage and current by controlling the ON/OFF operation of the switching element. The output of the battery charger 24 is connected to a moving contact SW and connectable to the battery 25 or a resistor R via the moving contact SW. With the battery 25 connected to the battery charger 24 via the moving contact SW, the battery 25 is charged by the battery charger 24.

During charging of the battery 25, the charging ECU 26 monitors the output voltage and current of the battery charger 24 and controls the switching element of the battery charger 24 so that the output voltage and current of the battery charger 24 reach their target values. In addition, the charging ECU 26 monitors a battery voltage Vb. When the battery voltage Vb reaches or exceeds a predetermined value, the charging ECU 26 transmits an OFF signal to the battery charger 24 and also transmits a charging completion signal to the vehicle controller 27. In response to a command from the vehicle controller 27 to start charging, the charging ECU 26 transmits an ON signal to the battery charger 24.

The vehicle controller 27 that serves as the controller of the present invention is operable to transmit command signals to the ground side controller 14, the charging ECU 26 and the warning device 29. The vehicle controller 27 has a detector for detecting the power received from the coil 11 or the power received from the output of the rectifier 23. The vehicle controller 27 has a determination mechanism that determines whether or not any abnormality is present in the automobile 1 and gives an alarm when the determination mechanism determines that any abnormality is present in the automobile 1. The determination mechanism determines whether or not any abnormality is present in the automobile 1 based on the detected received power, a charging completion signal and an unlock signal from an electronic key 28 (which will be described later).

In the present embodiment, the vehicle controller 27 instructs the charging ECU 26 to start charging the battery 25 in response to a charging start signal from the ground side controller 14 and receives a charging completion signal from the charging ECU 26 and/or a lock/unlock signal from the electronic key 28. When any abnormality is generated in the automobile 1, the vehicle controller 27 transmits a command signal that activates the warning device 29.

It is noted that the lock signal is a door lock actuating signal of the lock button of the electronic key 28 for locking the doors of the automobile 1 and that the unlock signal is a door unlock actuating signal of the unlock button of the electronic key 28 for unlocking the doors of the automobile 1. The warning device 29 is provided, for example, by a device that emits sound or light thereby to give an alarm.

Figure 3:
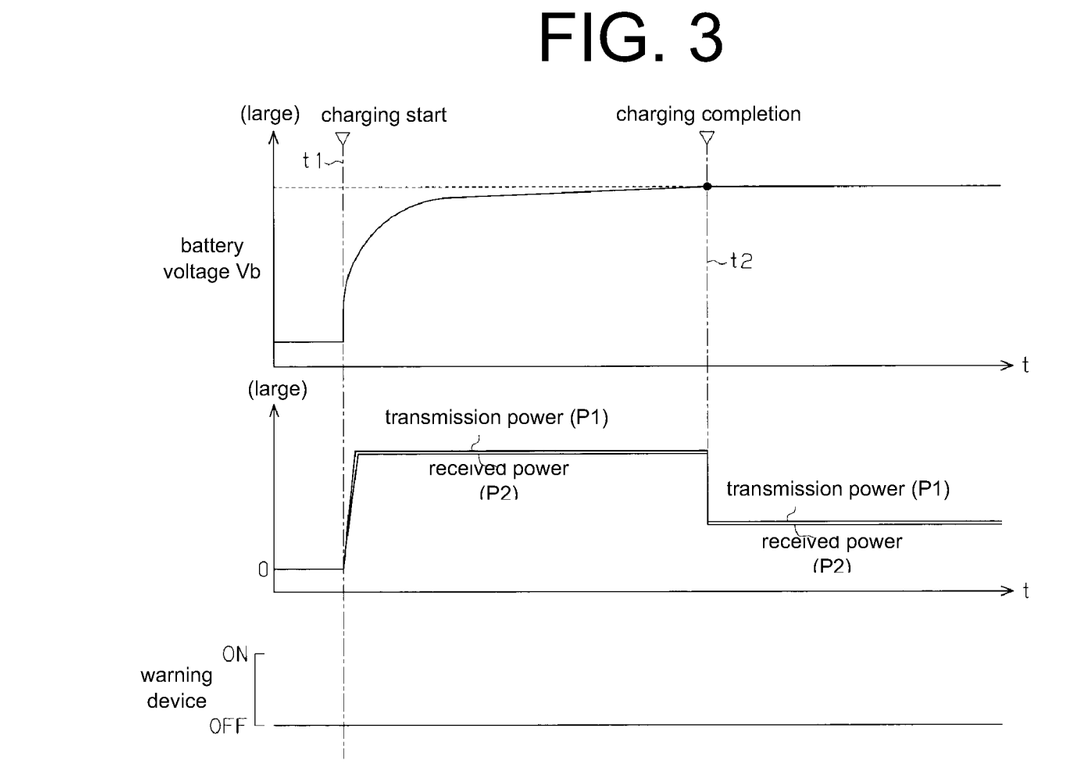
FIGS. 3 through 5 are timing diagrams illustrating the operation of the abnormality detection system of FIG. 2.
Figure 4:
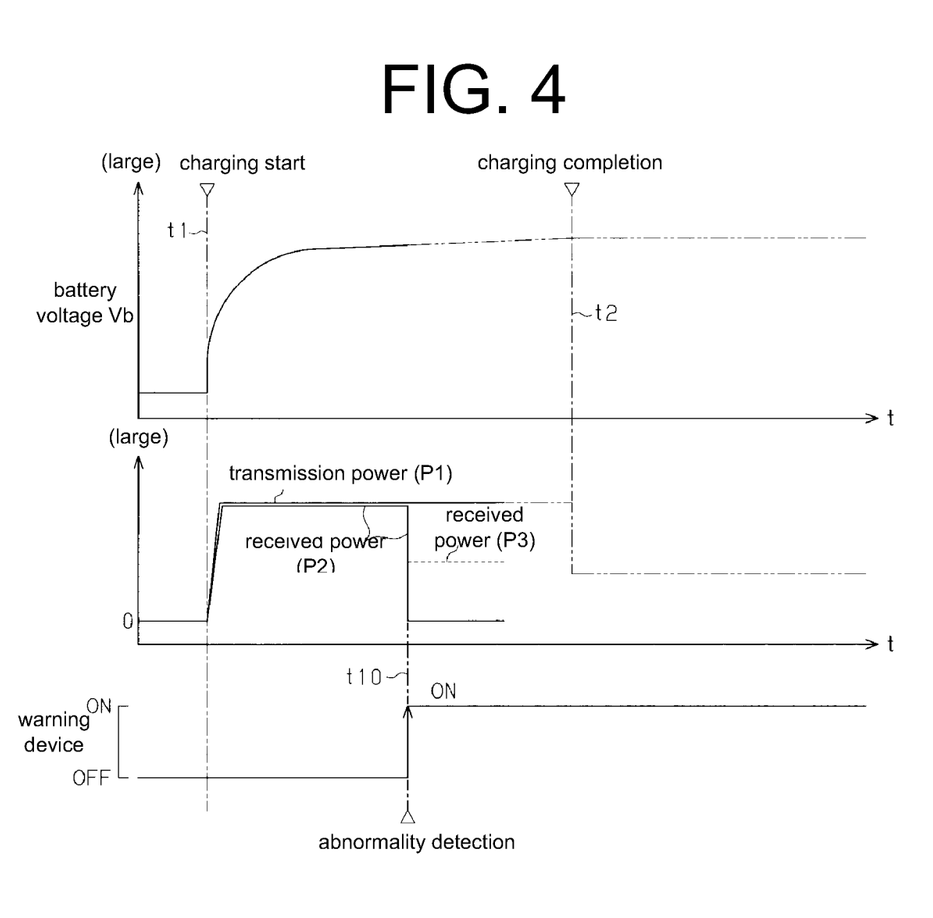
Figure 5:
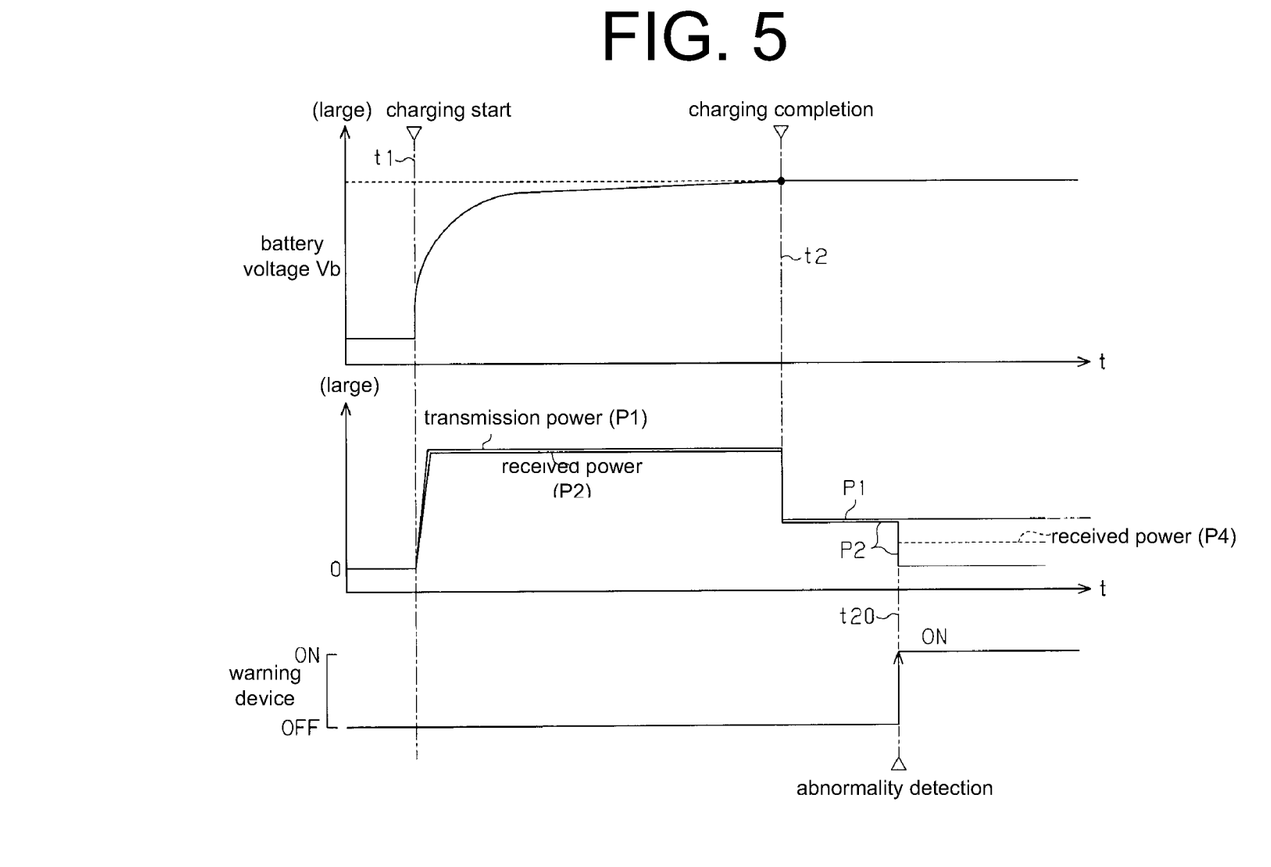
Figure 6:
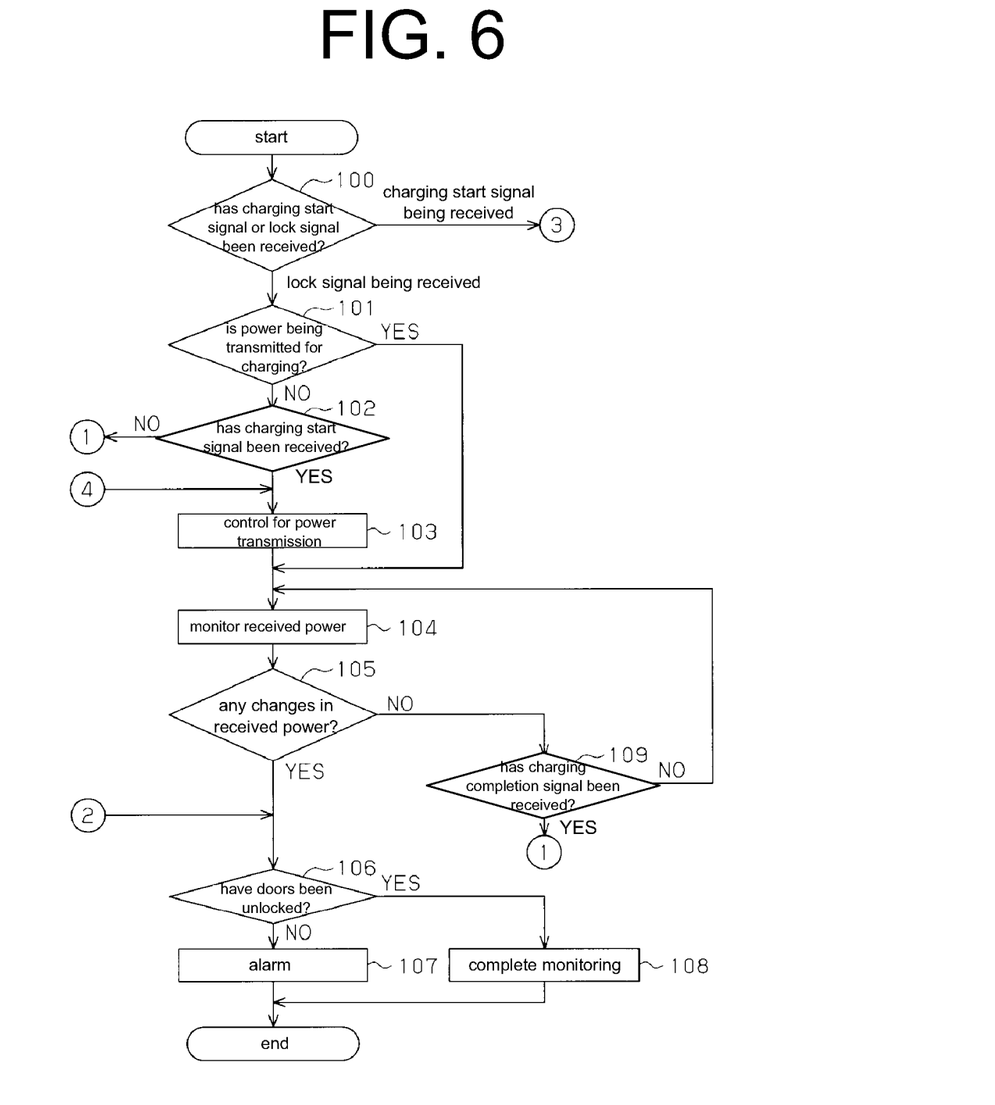
FIGS. 6 through 8 are flowcharts illustrating the operation of the abnormality detection system of FIG. 2.
Figure 7:
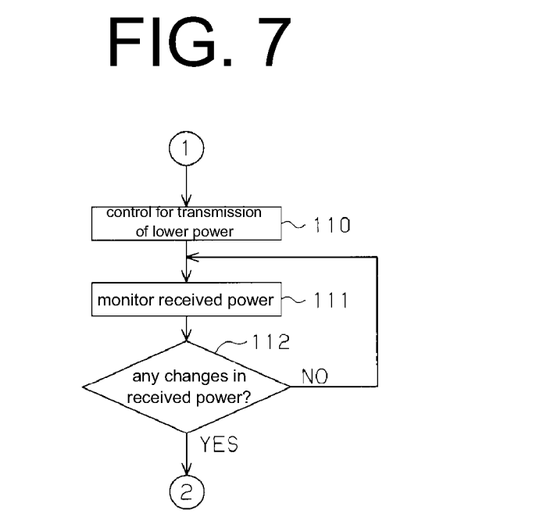
Figure 8:
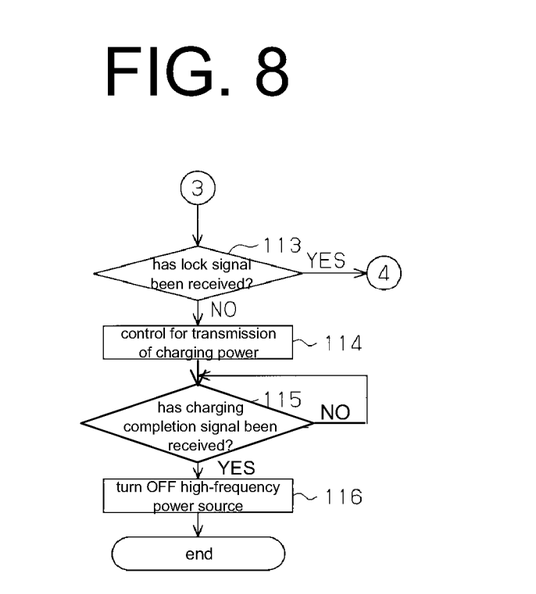

The following will describe the operation of the abnormality detection system, or the resonance type noncontact charging system, using the timing diagrams of FIGS. 3 to 5 and also the flowcharts of FIGS. 6 to 8. The vehicle controller 27 of FIG. 2 performs the steps of procedure shown in the flowcharts of FIGS. 6 to 8. Each of the timing diagrams of FIGS. 3 to 5 shows the battery voltage Vb, the transmission power P1, the received power P2 and the ON/OFF state of the warning device 29. When in its ON state, the warning device 29 emits an alarm such as warning sound.

Referring to FIG. 3, a person on the ground turns ON a charging start switch at the time t1 thereby to transmit a charging start signal to the ground side controller 14. The ground side controller 14 receiving the charging start signal informs the vehicle controller 27 of the receipt of the charging start signal. Then, the ground side controller 14 transmits an ON signal to the high-frequency power source 13 and controls the operation of the high-frequency power source 13 so that the high-frequency power source 13 outputs the power that charges the battery 25. The vehicle controller 27 that is informed of the receipt of the charging start signal by the ground side controller 14 instructs the charging ECU 26 to start charging the battery 25 and transmits an ON signal generated by the charging ECU 26 to the battery charger 24.

The power supplied from the high-frequency power source 13 is transmitted to the power receiving coil 21 via the coil 12 and the power transmission coil 11. In the vehicle equipment 20, the power received by the power receiving coil 21 is transmitted via the coil 22 to the rectifier 23. The power rectified by the rectifier 23 is then stepped up by the battery charger 24 and supplied to the battery 25. Thus, the battery voltage Vb is stepped up. When the battery voltage Vb reaches a predetermined threshold value at the time t2 of FIG. 3, the charging ECU 26 transmits a charging OFF signal to the battery charger 24 and also transmits a charging completion signal to the vehicle controller 27. Thus, the battery charger 24 is turned OFF. More specifically, the moving contact SW of FIG. 2 is switched from the battery 25 to the resistor R thereby to connect the output of the battery charger 24 to the resistor R.

Receiving the charging completion signal from the charging ECU 26, the vehicle controller 27 informs the ground side controller 14 of the charging completion via radio communication. The ground side controller 14 controls the operation of the high-frequency power source 13 so that the high-frequency power source 13 outputs a lower power that is lower than the power transmitted during the battery charging.

After the time t2 in FIG. 3, the ground side controller 14 controls the operation of the high-frequency power source 13 so that the high-frequency power source 13 outputs power of a predetermined magnitude (or lower power) that is lower than that of the power transmitted during the battery charging. The transmission of such power of the predetermined magnitude is used for detecting abnormality.

FIG. 3 is a timing diagram showing the operation of the abnormality detection system in a normal state when no abnormality occurs. FIGS. 4 and 5 are timing diagrams showing the operation of the abnormality detection system wherein abnormality occurs while the automobile 1 is parked. More specifically, FIG. 4 shows a case where abnormality occurs during the battery charging and FIG. 5 shows a case where abnormality occurs after the completion of the charging.

The operation of the abnormality detection system for detection of any abnormality will be described with reference to FIGS. 4 through 8. Referring to FIG. 6, the vehicle controller 27 determines at step 100 which of the charging start signal and the lock signal the vehicle controller 27 has received. If the vehicle controller 27 has received the lock signal (or if the door locking is actuated to lock the doors of the automobile 1), the vehicle controller 27 determines at step 101 whether or not power is being transmitted for charging the battery 25. If NO at step 101, the vehicle controller 27 determines at step 102 whether or not the vehicle controller 27 has received a charging start signal within a predetermined period of time since the receipt of the lock signal.

If YES at step 102, the vehicle controller 27 controls the operation of the high-frequency power source 13 via the ground side controller 14 at step 103 so that the high-frequency power source 13 transmits power for charging the battery 25. At step 104, the vehicle controller 27 monitors the power P2 received by the coil 21 and determines at step 105 whether or not there is a change in the received power P2. If YES at step 105, or if there is a change in the received power P2, e.g. at the time t10 in FIG. 4, the procedure is moved to step 106.

Figure 1B:
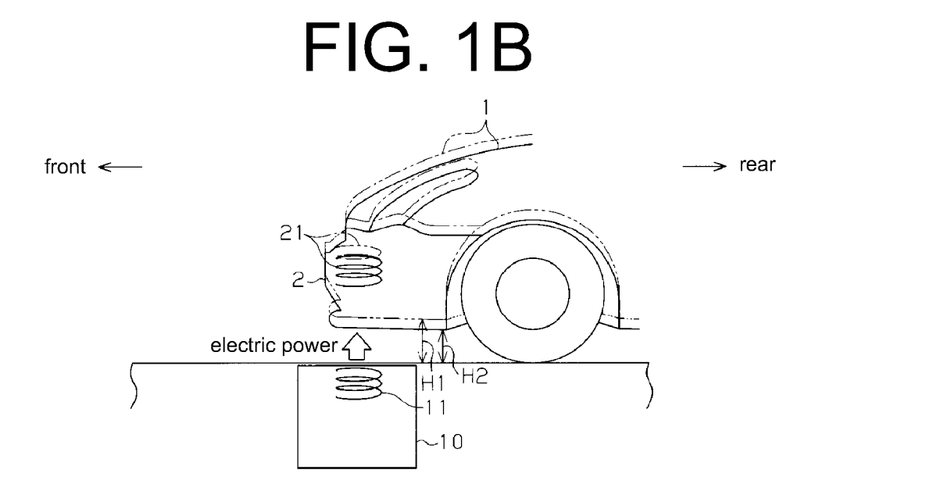

It is noted that when a person rides in the automobile 1, the vehicle height is reduced from H1 to H2 as shown in FIG. 1B and the power receiving coil 21 is lowered, so that the power received by the coil 21 is reduced. More specifically, if the impedance is matched in the case of the vehicle height H1, the impedance falls to be matched in the case of the vehicle height H2, so that the power received by the coil 21 is reduced.

At step 106, the vehicle controller 27 determines whether or not the doors have been unlocked by the electronic key 28. If a legitimate driver or owner of the automobile 1 rides in the automobile 1 by unlocking the doors of the automobile 1, the vehicle controller 27 determines that the procedure of abnormality detection has been completed and the monitoring of the received power is terminated at step 108.

On the other hand, in the event that there is a change in the received power P2 (or YES at step 105) in spite that the doors of the automobile 1 are not unlocked (or NO at step 106), it is considered that any intruder may have entered into the automobile 1. In such a case, at step 107 the vehicle controller 27 activates the warning device 29 to emit sound or light for giving an alarm.

If the automobile 1 is moved away from the power transmission coil 11, the automobile 1 cannot receive the power any more. In such a case, if the doors of the automobile 1 are not unlocked at step 106 when YES at step 105, it is considered that the automobile 1 may have been moved away from the power transmission coil 11. Thus, at step 107 the vehicle controller 27 activates the warning device 29 to emit sound or light for giving an alarm.

If an obstacle 40 such as steel plate is present between the power transmission coil 11 and the power receiving coil 21 as indicated by chain double-dashed line in FIG. 1A, the received power is reduced. More specifically, the received power P2 is reduced by half to the level P3 as indicated by dashed line in FIG. 4.

If there is a change in the received power P2 at step 105 and the doors of the automobile 1 are not unlocked at step 106 with the obstacle 40 present between the coils 11 and 21, it is considered that any obstacle such as 40 may have been placed between the coils 11 and 21. Thus, at step 107 the vehicle controller 27 activates the warning device 29 to emit sound or light for giving an alarm.

As is apparent from the foregoing description, during the period of time until the battery charging is completed, the vehicle controller 27 that serves as the determination mechanism performs various steps to determine whether or not any abnormality is present in the automobile 1 based on any change in the received power due to a change in the distance between the coils 11 and 21 or to the presence of any obstacle such as 40. If the vehicle controller 27 determines that any abnormality is present in the automobile 1, the vehicle controller 27 gives an alarm.

If the vehicle controller 27 determines at step 105 that there is no change in the received power P2, the vehicle controller 27 then determines at step 109 whether or not the vehicle controller 27 has received a charging completion signal. If NO at step 109, the procedure returns to step 104. If YES at step 109, the procedure is moved to step 110 of FIG. 7.

At step 110, the vehicle controller 27 controls the operation of the high-frequency power source 13 via the ground side controller 14 so that the high-frequency power source 13 outputs a power that is lower than the power transmitted during the battery charging. The vehicle controller 27 monitors the received power P2 at step 111 and determines at step 112 whether or not there is a change in the received power P2. If YES at step 112, or if there is a change in the received power P2 at the time t20 in FIG. 5), it is considered by the vehicle controller 27 that the vehicle height is reduced because any person rides in the automobile 1 and the power receiving coil 21 is lowered, accordingly, as shown in FIG. 1B. Thus, the procedure is moved to step 106 of FIG. 6. That is, the vehicle controller 27 determines that any intruder may have entered into the automobile 1.

The vehicle controller 27 determines at step 106 whether or not the doors have been unlocked by the electronic key 28. If a legitimate drive or owner of the automobile 1 rides in the automobile 1 by unlocking the doors of the automobile 1, the vehicle controller 27 completes the monitoring of the received power at step 108 and terminates the procedure of abnormality detection. The vehicle controller 27 turns OFF the high-frequency power source 13 via the ground side controller 14. On the other hand, if the doors of the automobile 1 are not unlocked at step 106 when YES at step 105, it is considered by the vehicle controller 27 that any intruder may have entered into the automobile 1. Thus, at step 107 the vehicle controller 27 activates the warning device 29 to emit sound or light for giving an alarm.

If the automobile 1 is moved away from the power transmission coil 11, the automobile 1 cannot receive the power any more. In such a case, if the doors of the automobile 1 are not unlocked at step 106 when YES at step 105, it is considered that the automobile 1 may have been moved away from the power transmission coil 11. Thus, at step 107 the vehicle controller 27 activates the warning device 29 to emit sound or light for giving an alarm.

If an obstacle 40 such as steel plate is present between the power transmission coil 11 and the power receiving coil 21 as indicated by chain double-dashed line in FIG. 1A, the received power is reduced. More specifically, the received power P2 is reduced by half to the level P4 as indicated by dashed line in FIG. 5.

If there is a change in the received power P2 at step 112 and the doors of the automobile 1 are not unlocked at step 106 with the obstacle 40 present between the coils 11 and 21, it is considered that any obstacle such as 40 may have been placed between the coils 11 and 21. Thus, at step 107 the vehicle controller 27 activates the warning device 29 to emit sound or light for giving an alarm.

As described above, after the battery charging is completed, the vehicle controller 27 that serves as the determination mechanism determines whether or not any abnormality is present in the automobile 1 based on any change in the received power due to a change in the distance between the coils 11 and 21 or to the presence of any obstacle such as 40. If the vehicle controller 27 determines that any abnormality is present in the automobile 1, the vehicle controller 27 gives an alarm.

If the vehicle controller 27 determines at step 112 of FIG. 7 that there is no change in the received power, the procedure is returned to step 111.

The following will describe a case where only the abnormality detection is made. If the vehicle controller 27 receives a lock signal at step 100 of FIG. 6, NO at step 101, and the vehicle controller 27 determines at step 102 that the vehicle controller 27 has not received a charging start signal within a predetermined period of time since the receipt of the lock signal, the procedure is moved to step 110 of FIG. 7. The vehicle controller 27 controls the operation of the high-frequency power source 13 via the ground side controller 14 at step 110 so that the high-frequency power source 13 outputs the aforementioned lower power. The vehicle controller 27 monitors the received power at step 111 and determines at step 112 whether or not there is a change in the received power. If YES at step 112, the vehicle controller 27 then determines at step 106 whether or not the doors have been unlocked by the electronic key 28. If YES at step 106 or if a legitimate driver or owner of the automobile 1 rides in the automobile 1 by unlocking the doors of the automobile 1, the vehicle controller 27 completes the monitoring of the received power at step 108 and turns OFF the high-frequency power source 13 via the ground side controller 14. On the other hand, if the doors of the automobile 1 are not unlocked at step 106 when YES at step 105, the vehicle controller 27 activates the warning device 29 at step 107 to emit sound or light for giving an alarm.

The following will describe the case where only the battery charging is performed. If the vehicle controller 27 receives a charging start signal at step 100, the procedure is moved to step 113 of FIG. 8, where the vehicle controller 27 determines whether or not the vehicle controller 27 has received a lock signal within a predetermined period of time since the receipt of the charging start signal. If NO at step 113, the procedure is moved to step 114, where the vehicle controller 27 controls the operation of the high-frequency power source 13 via the ground side controller 14 so that the high-frequency power source 13 outputs power for charging the battery 25. The vehicle controller 27 determines at step 115 whether or not the vehicle controller 27 has received a charging completion signal. If YES at step 115, the vehicle controller 27 turns OFF the high-frequency power source 13 via the ground side controller 14 at step 116. If YES at step 113, the procedure is moved to step 103 of FIG. 6.

At step 115 the vehicle controller 27 may monitor the received power so that if the received power is at a predetermined value or less, the vehicle controller 27 turns OFF the high-frequency power source 13 via the ground side controller 14 at step 116.

The following will describe the case where the vehicle controller 27 receives a lock signal during charging operation. If the vehicle controller 27 receives the lock signal at step 100 and YES at step 101, the procedure is moved to step 104. The vehicle controller 27 monitors the received power at step 104 and determines at step 105 whether or not there is a change in the received power. If NO at step 105, the vehicle controller 27 determines at step 109 whether or not the vehicle controller 27 has received a charging completion signal. If NO at step 109, the procedure is returned to step 104. The vehicle controller 27 repeats steps 104, 105 and 109. If the vehicle controller 27 receives the charging completion signal at step 109, the procedure is moved to step 110 of FIG. 7, where the vehicle controller 27 controls the operation of the high-frequency power source 13 via the ground side controller 14 so that the high-frequency power source 13 outputs the lower power. The vehicle controller 27 monitors the received power at step 111 and determines at step 112 whether or not there is a change in the received power.

On the other hand, if YES at step 105 during the above charging operation, the vehicle controller 27 determines at step 106 whether or not the doors have been unlocked. If YES at step 106, the vehicle controller 27 completes the monitoring of the received power at step 108. If NO at step 106, the vehicle controller 27 gives an alarm at step 107.

The following will describe the case where the vehicle controller 27 receives a charging start signal while checking for any abnormality. If the vehicle controller 27 receives a lock signal at step 100 of FIG. 6 and NO at step 101, the procedure is moved to step 102. If NO at step 102, the procedure is moved to step 110 of FIG. 7, where the vehicle controller 27 controls the operation of the high-frequency power source 13 via the ground side controller 14 so that the high-frequency power source 13 outputs the lower power. The vehicle controller 27 monitors the received power at step 111 and determines at step 112 whether or not there is a change in the received power.

If the vehicle controller 27 receives the charging start signal at step 100 while checking for any abnormality, the procedure is moved to step 113 of FIG. 8. Since the vehicle controller 27 has already received the lock signal, the procedures is moved to step 103 of FIG. 6, where the vehicle controller 27 controls the operation of the high-frequency power source 13 via the ground side controller 14 so that the high-frequency power source 13 outputs power for charging the battery 25. The vehicle controller 27 monitors the receive power at step 104 and determines at step 105 whether or not there is a change in the received power. If NO at step 105, the vehicle controller 27 then determines at step 109 whether or not the vehicle controller 27 has received a charging completion signal. If NO at step 109, the procedure is returned to step 104 and the vehicle controller 27 repeats steps 104, 105 and 109. If the vehicle controller 27 receives the charging completion signal at step 109, the procedure is moved to step 110 of FIG. 7, where the vehicle controller 27 controls the operation of the high-frequency power source 13 via the ground side controller 14 so that the high-frequency power source 13 outputs the lower power. The vehicle controller 27 monitors the received power at step 111 and determines at step 112 whether or not there is a change in the received power.

On the other hand, if YES at step 105 during the above charging operation, the vehicle controller 27 determines at step 106 whether or not the doors have been unlocked. If YES at step 106, the vehicle controller 27 completes the monitoring of the received power at step 108. If NO at step 106, the vehicle controller 27 gives an alarm at step 107.

The following will describe the advantageous effects of the present embodiment.

(1) The vehicle controller 27 has a function to detect the power received by the power receiving coil 21 in the vehicle equipment 20. That is, the abnormality detection system has a detector. The vehicle controller 27 determines whether or not any abnormality is present in the automobile 1 based on the received power. More specifically, the vehicle controller 27 is operable to determine whether or not there is a change in the received power and hence determines whether or not any abnormality is present in the automobile 1. Thus, abnormality of the automobile 1 is detectable.

(2) Since the power received by the power receiving coil 21 is used for charging the battery 25, abnormality is detectable in the charging system. Thus, the structure of the noncontact charging system is used to detect abnormality, which reduces the cost for detecting abnormality.

(3) The vehicle equipment 20 has the warning device 29 that is operated when the vehicle controller 27 determines that abnormality is present in the automobile 1. The warning device 29 gives warning in case of an abnormality, so that the automobile 1 is protected from theft.

(4) In the present system wherein any intruder is detectable by monitoring the power received by the coil 21, or wherein any abnormality is detectable by detecting a change of the received power caused by a change of the vehicle height, undetectable area of the automobile 1 is reduced as compared to the case where radio waves, sound waves and supersonic waves are used for detecting the intruder. Since the vehicle height is not so lowered in the event that a small animal rides on the automobile 1, the likelihood that such small animal is falsely detected as intruder is reduced.

The present invention has been described in the context of the above first embodiment, but it is not limited to the embodiment. It is obvious to those skilled in the art that the invention may be practiced in various manners as exemplified below.

Although in the above-described embodiment the vehicle controller 27 has therein the received power detector, a detection circuit that serves as the received power detector may be provided separately from the vehicle controller 27 for detecting the received power.

If the vehicle controller 27 determines that the doors are locked at step 100 of FIG. 6, abnormality detection is started. In addition, if the vehicle controller 27 determines that the doors are unlocked at step 106, abnormality detection is stopped. Instead, switches for starting and stopping the abnormality detection may be provided in the ground installation 10 or the electronic key 28 of FIG. 2. In this case, the start switch is activated thereby to start abnormality detection at step 100 of FIG. 6. The stopping switch is activated thereby to stop abnormality detection at step 106. In such a system, abnormality detection may be started or stopped as required with the automobile doors unlocked.

According to the above-described embodiment, the determination of whether or not any abnormality is present in the automobile 1 by the vehicle controller 27 is performed based on the received power P2 relative to the constant transmission power P1 as shown in FIG. 3. According to the present invention, however, the determination may be based on the ratio of the received power P2 to variable transmission power P1 which keeps the battery voltage at a constant value during charging operation.

It may be so arranged that in the case of detection of abnormality or of any intruder, the abnormality may be informed to a device provided outside the automobile 1 instead of alarming by the warning device 29. More specifically, abnormality may be informed to a mobile phone.

Although the power receiving coil 21 is mounted in the front bumper of the automobile 1, the power receiving coil 21 may be mounted to the automobile 1 other than the front bumper.

The power transmission coil 11 may not be arranged necessarily with the axis thereof extending perpendicularly to the ground.

Although the power transmission coil 11 and the power receiving coil 21 are formed by winding a copper wire in a spiral manner, they may be formed by winding a copper wire otherwise.

In the above-described embodiment, the door lock signal triggers the start of abnormality detection. An automobile can recognize whether or not its electronic key is present near the automobile. Therefore, start of abnormality detection may be triggered by failure of the automobile to recognize its electronic key.

When the battery charger 24 is turned OFF on completion of charging the battery 25, the output of the battery charger 24 is connected to the resistor R. However, the output of the battery charger 24 may be simply opened.

Although the rectifier 23 detects at the output thereof the received power, it may be so arranged that the coils 21 and 22 detect the received power.

It may be also arranged so that battery charging is stopped if any obstacle such as 40 is present between the coils 11 and 12 as shown in FIG. 1A. More specifically, if the vehicle controller 27 determines that there is a change in the received power at step 105 of FIG. 6 and the change is relatively small, it may be then considered that an obstacle such as 40 is present between the coils 11 and 12 and the battery charging is stopped.

Although the abnormality detection system in the above-described embodiment is applied to the resonance type noncontact charging system for charging a battery in a vehicle such as a hybrid vehicle, it is not limited to such application but applicable otherwise as exemplified below.

The abnormality detection system is not limited to a system having a charging function, but may be a system having no charging function. That is, referring to FIG. 2, a simple load may be connected to the coil 22 instead of the charging rectifier 23. In this case, the high-frequency power source 13 transmits a low power to the power transmission coil 11 and a change in the power is monitored for detection of any abnormality.

In the above-described embodiment, the detection of any abnormality in the automobile 1 is performed based on a change of the received power caused by a change of the vertical distance between the coils 11 and 21 (or vehicle height). However, the detection may be performed based on a change of the received power caused by a change of the horizontal distance between the coils.

When only abnormality detection is performed (when power is supplied after battery charging is completed or after the time t2 of FIG. 3), the high-frequency power source 13 may output power intermittently.

Although in the above-described embodiment it is considered that battery charging is completed when the battery voltage Vb reaches a predetermined threshold value as shown in FIG. 3, battery charging may be considered to be completed when a predetermined time has passed since the battery voltage Vb reached a predetermined threshold value.

Although in the above-described embodiment the ground side controller 14 receives a charging start signal and then informs the vehicle controller 27 of the receipt of the charging start signal to via radio communication, it may be so arranged that only the vehicle controller 27 receives the charging start signal. Alternatively, both of the ground side controller 14 and the vehicle controller 27 may receive the charging start signal.

The warning device 29 is provided in the vehicle equipment 20 in the embodiment, but it may be provided in the ground installation 10.

In the case where the impedance is not matched in the vehicle height H1 shown in FIG. 1B, data of the magnitude of the power then being received by the power receiving coil 21 may be stored in a memory. Such data may be used for detecting a change of the vehicle height from H1 to H2 that indicates an abnormality occurring in the automobile 1.

Although in the abnormality detection system of the present embodiment the object of abnormality detection is an automobile, it may be any other object than automobile. Any object that is movable and receives electric power such as cashbox, mobile phone, and personal digital assistance (PDA) may be detected for abnormality. In case of a mobile phone, a high-frequency power source and a primary coil are incorporated in a mobile phone stand, while a secondary coil and a load are incorporated in the mobile phone. The abnormality detection system determines an abnormality in the mobile phone when the mobile phone is taken away from the stand and there occurs a change in the power being received. It may be so arranged that the stand gives an alarm in such a case thereby to inform the owner of the mobile phone of abnormality.

Although the abnormality detection system of the above-described embodiment is a resonance type noncontact charging system having the power transmission coil 11, the power receiving coil 21, the coils 12 and 22, the present invention is not limited to such structure. The abnormality detection system of the present invention may be applied to a noncontact power transmission system operable by electromagnetic induction. This noncontact power transmission system dispenses with the power transmission coil 11 and the power receiving coil 21, but has the coil 22 arranged so as to be magnetically coupled to the coil 12 for receiving power from the coil 12 by electromagnetic induction.

What is claimed:

1. An abnormality detection system for detecting an abnormality of an object, comprising:
   a high-frequency power source for supplying power;
   a primary coil for receiving the power supplied from the high-frequency power source;
   a secondary coil mounted to the object in noncontact with the primary coil for receiving power supplied from the primary coil;
   a battery charged by the power received by the secondary coil;
   a resistor for receiving the power received by the secondary coil;
   a moving contact for allowing the power received by the secondary coil to be supplied to the battery or the resistor; and
   a controller for controlling operation of the moving contact, the controller being operable to detect the power received by the resistor through the secondary coil and also to detect a change in a magnitude of the detected power due to a change in distance between the primary coil and the secondary coil or a change in the magnitude of the detected power due to an obstacle present between the primary coil and the secondary coil, thereby to determine that an abnormality is present in the object.

2. The abnormality detection system according to claim 1, wherein the object is an automobile.

3. The abnormality detection system according to claim 1, wherein the object has a battery that is charged with the power received by the secondary coil.

4. The abnormality detection system according to claim 1, further comprising a warning device that is operated when the controller determines that the abnormality is present in the object.

* * * * *